(12) United States Patent
Hough

(10) Patent No.: US 9,759,373 B2
(45) Date of Patent: Sep. 12, 2017

(54) FABRIC ATTACHMENT SYSTEM

(71) Applicant: Dowco, Inc., Manitowoc, WI (US)

(72) Inventor: Justin Hough, Lebanon, MO (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 14/820,793

(22) Filed: Aug. 7, 2015

(65) Prior Publication Data
US 2016/0040826 A1 Feb. 11, 2016

Related U.S. Application Data
(60) Provisional application No. 62/034,471, filed on Aug. 7, 2014.

(51) Int. Cl.
*A47B 96/06* (2006.01)
*F16M 13/02* (2006.01)
*F16B 2/14* (2006.01)

(52) U.S. Cl.
CPC ............. *F16M 13/022* (2013.01); *F16B 2/14* (2013.01); *B63B 2221/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,065,724 A | * | 11/1962 | Tritt | B63B 3/142 114/219 |
| 3,172,419 A | * | 3/1965 | Lewis | B63B 17/02 114/361 |
| 3,186,129 A | * | 6/1965 | Blood | E04B 9/065 160/371 |
| 3,572,353 A | * | 3/1971 | Pinkly | B63B 17/02 114/361 |
| 3,774,959 A | * | 11/1973 | Brudy | B63B 17/02 135/119 |
| 4,292,913 A | * | 10/1981 | Siebert | B63B 59/02 114/219 |
| 4,757,854 A | * | 7/1988 | Rippberger | F16B 5/0692 160/378 |
| 4,887,626 A | * | 12/1989 | Dalo | E04H 15/642 135/119 |
| 4,991,640 A | * | 2/1991 | Verkindt | B60P 7/04 160/368.1 |
| 5,058,652 A | * | 10/1991 | Wheatley | B60P 7/04 160/327 |
| 5,152,574 A | * | 10/1992 | Tucker | B60P 7/04 296/100.18 |

(Continued)

OTHER PUBLICATIONS http://www.kederrails.com/pvcrails.html; website screenshot of American Keder, Inc. PVC rails; captured Feb. 19, 2015 (prior art for purposes of prosecution).

(Continued)

*Primary Examiner* — Monica Millner
(74) *Attorney, Agent, or Firm* — Shane Delsman; Godfrey & Kahn, S.C.

(57) ABSTRACT

An attachment for attaching an accessory to a structure such as a vehicle or boat through a rail having a track. The attachment has at least one welt that is shaped and/or sized to fit within the facial opening of the track when no tensile force is exerted on the attachment and with retained within the track when tensile force is exerted on the attachment.

12 Claims, 14 Drawing Sheets

(56) References Cited

U.S. PATENT DOCUMENTS

| | | | | |
|---|---|---|---|---|
| 5,203,055 | A * | 4/1993 | Broadwater, Sr. | B60J 7/104 135/119 |
| 5,339,763 | A * | 8/1994 | Erskine | B63B 19/02 114/361 |
| 5,343,824 | A * | 9/1994 | Floyd | B63B 17/02 114/347 |
| 5,367,977 | A * | 11/1994 | Ellis | A44B 19/16 114/361 |
| 5,702,147 | A * | 12/1997 | Essig | B60J 7/104 135/119 |
| 5,893,227 | A * | 4/1999 | Johansson | G09F 15/0025 160/328 |
| 5,970,904 | A | 10/1999 | Wellen et al. | |
| 5,984,400 | A * | 11/1999 | Miller | B60J 7/104 296/100.15 |
| 6,089,179 | A * | 7/2000 | Pestel | B60P 3/1008 114/345 |
| 6,158,377 | A * | 12/2000 | Szukhent, Jr. | B63B 17/02 114/361 |
| 6,170,901 | B1 * | 1/2001 | Hartmann | B29C 37/0082 296/100.07 |
| 6,257,306 | B1 * | 7/2001 | Weldy | B60J 7/104 160/327 |
| 6,341,810 | B2 * | 1/2002 | Hartmann | 296/100.07 |
| 6,386,616 | B1 * | 5/2002 | Wheatley | B60J 7/123 296/100.16 |
| 6,499,791 | B2 * | 12/2002 | Wheatley | B60J 7/104 296/100.16 |
| 6,871,685 | B2 * | 3/2005 | Freney | E04H 15/08 160/269 |
| D526,888 | S * | 8/2006 | Heindl | D8/382 |
| D527,619 | S * | 9/2006 | Heindl | D8/382 |
| 7,143,717 | B2 | 12/2006 | Murphy | |
| D550,604 | S * | 9/2007 | Walton | D12/317 |
| 7,434,534 | B2 * | 10/2008 | Erskine | B63B 17/02 114/361 |
| 7,640,882 | B2 * | 1/2010 | Parniske | B63B 17/02 114/361 |
| 8,839,731 | B2 * | 9/2014 | Rezzonico | B63B 59/02 114/219 |
| 9,301,624 | B2 * | 4/2016 | Rosenthal | A47D 13/063 |
| 2009/0194016 | A1 | 8/2009 | Murphy | |

OTHER PUBLICATIONS http://www.kederrails.com/pvcrails2.html; website screenshot of American Keder, Inc. Keder Rail Strip; captured Feb. 19, 2015 (prior art for purposes of prosecution).
http://www.kederrails.com/singleprofile.html; website screenshot of American Keder, Inc. Single Profile Aluminum Keder Rails; captured Feb. 19, 2015 (prior art for purposes of prosecution).
http://www.kederrails.com/2profile.html; website screenshot of American Keder, Inc. 2-Profile Aluminum Keder Rails; captured Feb. 19, 2015 (prior art for purposes of prosecution).
Morse Industries Marine Catalog No. 25; Oct. 30, 2009.
Made in America, LLC; plans of Awning Rail; drawing No. 50-AWR; drawn Jan. 23, 2013.
Made in America, LLC; plans of Keder Rail; drawing No. 90-PVC-DUB; drawn Apr. 26, 2012.
Made in America, LLC; plans of Rail; drawing No. 90-KR-DUB; drawn Jun. 28, 2011.
Made in America, LLC; plans of Rail; drawing No. 13-KR-DUB; drawn Apr. 29, 2011.
Made in America, LLC; plans of Awning Rail; drawing No. 13-KR-20DUB; drawn Apr. 29, 2011.
Made in America, LLC; plans of Rail; drawing No. 13-KR-35DUB; drawn Apr. 23, 2011.
Made in America, LLC; plans of Rail; drawing No. 13-SKR-90; drawn Apr. 26, 2012.
Made in America, LLC; plans of Rail; drawing No. 13-SKR; drawn Feb. 6, 2011.
Made in America, LLC; plans of Single Keder Rail; drawing No. 17-SKR; drawn Oct. 19, 2012.
Made in America, LLC; plans of Single Keder Rail; drawing No. 18-SKR-90; drawn Jul. 21, 2012.
Made in America, LLC; plans of Awning Rail; drawing No. 85-AWR; drawn Dec. 5, 2011.
Made in America, LLC; plans of PVC Rail with Flexible Flap; drawing No. 85-KR-RF; drawn Jan. 9, 2012.
Made in America, LLC; plans of Radius Rail; drawing No. 85-KR-RAD; drawn Jun. 23, 2011.
Made in America, LLC; plans of Single Keder Rail; drawing No. 85-SKR-90; drawn Apr. 26, 2012.
Made in America, LLC; plans of Single Keder Rail; drawing No. 85-SKR; Mar. 7, 2011.
Website screenshot; https://www.youtube.com/watch?v=RepAaag_wbQ; link to youtube video titled How to use Bennington's Quick Clip Mooring Cover; captured Feb. 20, 2015; published Jun. 10, 2013.
Website screenshot; http://www.boattest.com/boats/boat_video.aspx?ID=3035;BoatTest.com; captured Feb. 20, 2015; (prior art for purposes of prosecution).
Website screenshot; http://www.ebay.com/itm/HARRIS-KAYOT-FSH-230-PONTOON-BOAT-COVER-BURGUNDY-W-VENTS-MARINE-BOAT-/191343936000; ebay listing of Harris Kayot FSH 230 Pontoon Boat Cover Burgundy w/Vents Marine Boat; captured Feb. 20, 2015; date identified on tag Oct. 6, 2010.
Website screenshot; https://shop.pontoons.com/store/detail/259/playpen_storage_covers_miscellaneous_canvas/2002/j_clip_kit_b/; Premier Marine, Inc.; captured Mar. 17, 2015; (prior art for purposes of prosecution).
Website screenshot; http://www.crestliner.com/crestliner-legacy/; Crestliner Legacy; captured Feb. 20, 2015; date clip J-Hook introduced 2005.
Brochure and catalog for Harris Flotebote; vol. 4; Issue 1; 2013.
Photograph of Bennington Clip; 2015; (prior art for purposes of prosecution).
Website screenshot; http://www.keder.com/kedermain2.html; captured Mar. 17, 2015).
Made in America, LLC; Double Flap Keder specification sheet; Mar. 18, 2015; (prior art for purposes of prosecution).
Made in America, LLC; Keder sizes and color chart; Mar. 18, 2015; (prior art for purposes of prosecution).
Made in America, LLC; Repair Flap Keder specification sheet; Mar. 18, 2015; (prior art for purposes of prosecution).
Made in America, LLC; Single Flap Keder specification sheet; Mar. 18, 2015; (prior art for purposes of prosecution).
Made in America, LLC; Welded Flap Keder specification sheet; Mar. 18, 2015; (prior art for purposes of prosecution).

* cited by examiner

US 9,759,373 B2

FABRIC ATTACHMENT SYSTEM

PRIORITY CLAIM AND CROSS-REFERENCE TO RELATED APPLICATION

This application claims the benefit of U.S. Provisional Patent Application No. 62/034,471 filed on Aug. 7, 2014, the disclosure of which is hereby incorporated by reference herein, in its entirety, for all purposes.

FIELD OF THE INVENTION

The present invention relates generally to the field of attachments. More particularly, the present invention relates to the attachment of accessories to structures such as boats.

BACKGROUND

The desire to attach and detach an accessory or product to a vehicle or structure exists in many different industries. For example, in the marine equipment industry, canvas covers are attached to boats, canvas sun shades are attached to foldable support structures (commonly called biminis), sail systems are attached to booms, and fabric accessories are attached to awnings. Most often, such attachments use mechanical fasteners such as round metal snaps, metal grommets, plastic zippers or sewn pockets that are difficult to install and operate and can also increase the cost of such attachments. Further, the functionality of such attachments degrades over time which can further complicate and frustrate use. Repair and replacement of such attachments can also be difficult and expensive to the extent replacement is possible at all.

One attachment or coupler that has been used to overcome such problems is the use of a keder, usually round in shape, that fits into a track, rail or receptacle. However, such keder and track attachments have not been fully utilized.

Currently, most keder and track attachments require that an end of the keder be inserted into an open end of the track and then the keder is further slid along the length or face of the track until the accessory attached to the keder, e.g. a boat cover, is in place and/or securely attached. The track retains the keder by having a facial opening along a rail of a size and/or shape through which the engagement portion of a keder may not be pulled through, but allows the attachment portion of the keder which is attached to an accessory to be slid. Sliding the keder within the track can cause the material to wear away thus decreasing the life of the product, for example a cover. Further, in applications where the track is very long, the un-inserted potion of the keder may begin to bunch up or get caught at the entry point or end of the track. The keder at the end of the track must then be un-bunched and inserted into the track. The installer may have to walk back and forth between the end of the keder in the track and the un-inserted keder, or even select locations there between, to fully insert the keder. This can be especially problematic if the track has bends or if the track is even slightly damaged or if a boat, for example, is on a trailer or lift. Similarly, to remove the fabric, the keder must be slid back along the length of the track until the end of the keder is withdrawn from the open end of the track.

As such, the current keder and track attachment limits its use to those applications that allow for the keder to be slid along the entire length of the track and where time is not an issue. This is not only limiting, but can also be inconvenient and time consuming.

Therefore, there is a need for an attachment, coupler or mechanism that allows an accessory, such as a fabric cover, to be attached to a rail at any point along the rail quickly and easily. There is also a need for an attachment that has sufficient pull-out resistance and reduces wear to the attachment and accessory.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

Figure 1:
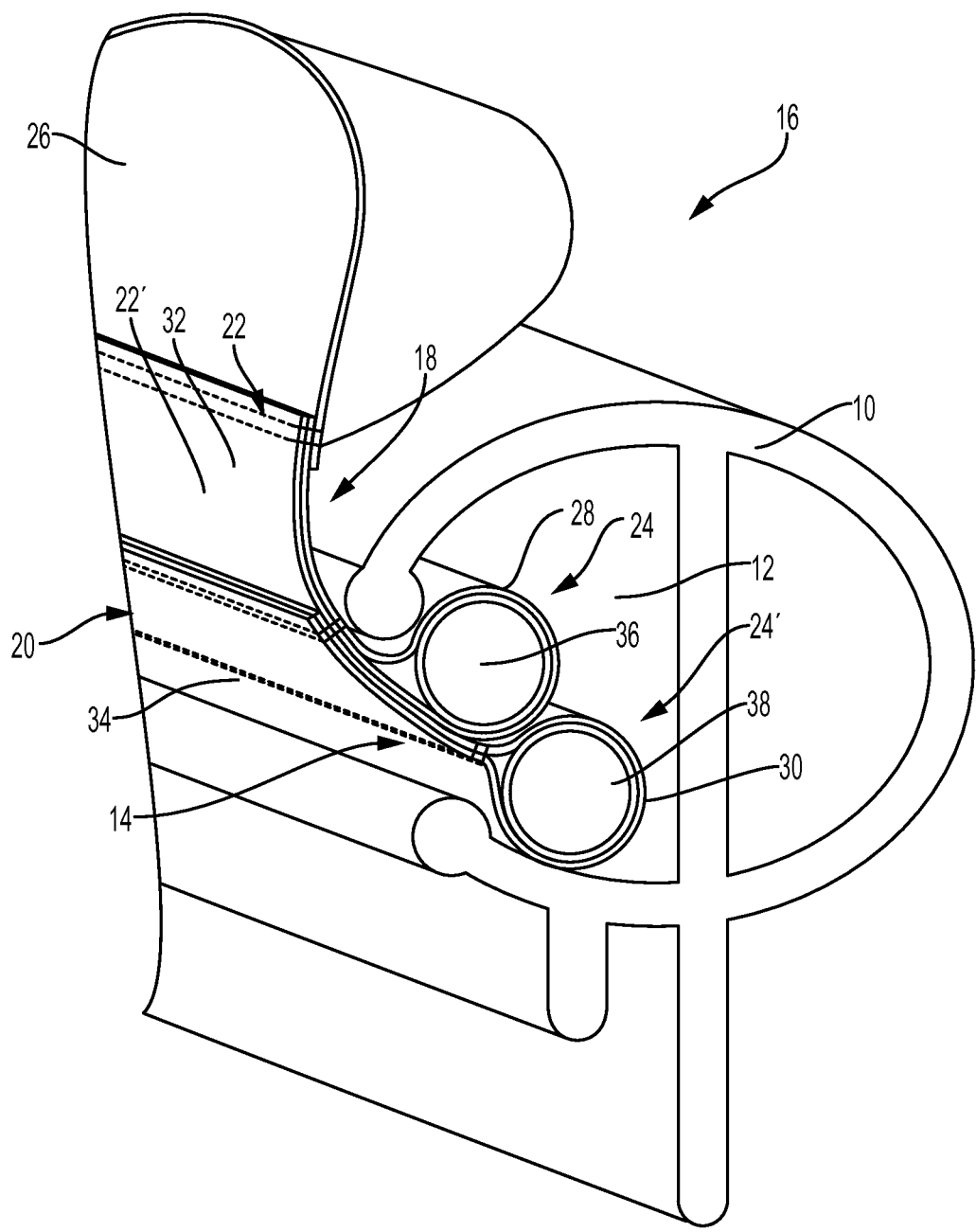
FIG. 1 is an end perspective view of an attachment engaged in a rail.

In one embodiment, the invention provides an attachment for connecting an accessory to a rail. The rail has a track with a facial opening. The accessory includes a keder with a welt portion and an attachment portion. The attachment portion is attached to the accessory. A second welt is attached to the keder. Each of the welt portion of the keder and second welt can be inserted through the facial opening and into the track when no tensile force is applied to the attachment and the welt portion of the keder and second welt are retained in the track when the tensile force is applied to the attachment.

In another embodiment, the invention provides a keder for attaching an accessory to a rail having a track with a facial opening. The keder includes a welt and a keder material. The welt is shaped and sized such that the welt may be inserted through the facial opening and into the track in a first orientation and is prevented from being withdrawn from the track through the facial opening in a second orientation. The keder material is secured to the welt at a first end and to the accessory at a second end. The accessory is attached to the rail when the welt is in the track and in the second orientation.

In another embodiment, the invention provides an integrally formed keder for attaching an accessory to a rail having a track with a facial opening. The keder includes an engagement portion and an attachment portion. The attachment portion is secured to the accessory. The engagement portion is shaped and sized such that the engagement portion may be inserted through the facial opening and into the track in a first orientation and is prevented from being withdrawn from the track through the facial opening in a second orientation. The accessory is attached to the rail when the engagement portion is in the track and in the second orientation.

In another embodiment, the invention provides a coupler for selectively attaching an accessory to a rail having a groove. The coupler including an attachment portion for attaching the coupler to the accessory and an engagement portion having a welt for attaching the coupler to the rail. When there is no tensile force on the coupler, at least part of the welt may be inserted through an opening to the groove and into the groove. When the at least part of the welt is in the groove and a tensile force is applied to the coupler, at least part of the welt is retained in the groove.

In another embodiment, the invention provides a method of attaching a cover to a boat having a rail with a track with a facial opening. The method including inserting an oblong welt attached to the cover through the facial opening and into the track such that a major axis of the oblong welt is generally perpendicular to the facial opening and applying a tensile force to the oblong welt such that the oblong welt rotates within the track and the major axis of the oblong welt is generally parallel to the facial opening to prevent the oblong welt from being withdrawn from the track.

In another embodiment, the invention provides a method of attaching an accessory to a rail having a track with a facial opening. The method includes inserting a first welt through the facial opening and into the track, wherein the first welt is attached to the accessory. Inserting a second welt through the facial opening and into the track, wherein the second welt is attached to the accessory. Applying a tensile force to the first and second welts such that the first and second welts to form a mass larger than the facial opening to hold the accessory to the rail.

DETAILED DESCRIPTION

An attachment, coupler or mechanism with at least one keder in accordance with the present invention can be inserted into and removed from a track in a rail through a facial opening. When tensile force is applied to the attachment, the engagement portion of the keder engages the track such that the attachment is retained by the rail.

As seen in FIG. 1, an end of a rail 10 is shown with a track or groove 12. The shape of the rail 10, track 12 and/or facial opening or aperture 14 of the track can have any known configuration, but in the embodiment shown in FIG. 1, the rail is generally round and the track is a cavity in the rail. The attachment, coupler or mechanism 16 shown in FIG. 1 has a keder 18 that includes an attachment portion 22 that generally remains outside of the rail and an engagement portion 24 that generally engages with the track 12. Although the attachment portion 22 could be made of any suitable material, in FIG. 1, the attachment portion material is made from a fabric such as canvas. The attachment portion 22 can be attached to an accessory 26 such as a cover, tarp, sail, shade, or any other object which is desired to be attached to a rail 10 or to which the rail is attached, in any known manner such as by stitching, riveting, welding, bonding, thermosetting, adhering, etc. By way of example only, the attachment portion 22 of the coupler could be sewn to a canvas cover for a boat such that the cover is attached to the boat by engagement of the coupler in a track of a gunnel rail, mid-rail or bumper of the boat.

The engagement portion 24 can be shaped, sized and made of a material such that the engagement portion may be inserted into the track 12 and be held and retained therein when tension is applied to the attachment 16. In FIG. 1, the attachment 16 includes two keders 18, 20 attached to one another and to the accessory 26. Each of the two keders 18, 20 has an engagement portion 24, 24' including a welt portion or welt portion 28, 30, in this case a gasket type welt, formed by wrapping a keder material 32, 34 around a core 36, 38 and sewing the keder material back to itself.

The core could comprise of a suitable material exhibiting properties desirable for particular function. For example, for some applications a core must be able to compress to fit through a smaller facial opening, but resist compression under tensile pull such that it does not over-compress and is not undesirably withdrawn from the track. Similarly, the core(s) of the present invention could have different shapes or profiles and variations or additional features to the overall shape to improve engagement with the facial opening, track and/or rail, some of which will be described in other keder embodiments. For example, the core of a gasket type welt could include a foam tube or cylinder and the core of a piping type welt could include a harder plastic tube or cylinder.

In the embodiment shown in FIG. 1, the attachment portion 22 of the first keder 18 is then sewn to the second keder 20 and the attachment portion 22' of the second keder 20 is then sewn to the material or object which is desired to be attached to a rail 10 or to which the rail is attached, for example a boat cover. However, any number of configurations of attaching the keders to one another and/or the accessory could be used without defeating the spirit of the invention. For example, in the embodiment shown in FIG. 1, the keders are attached in an alignment that promotes passage through the facial opening and into the track.

Figure 2:
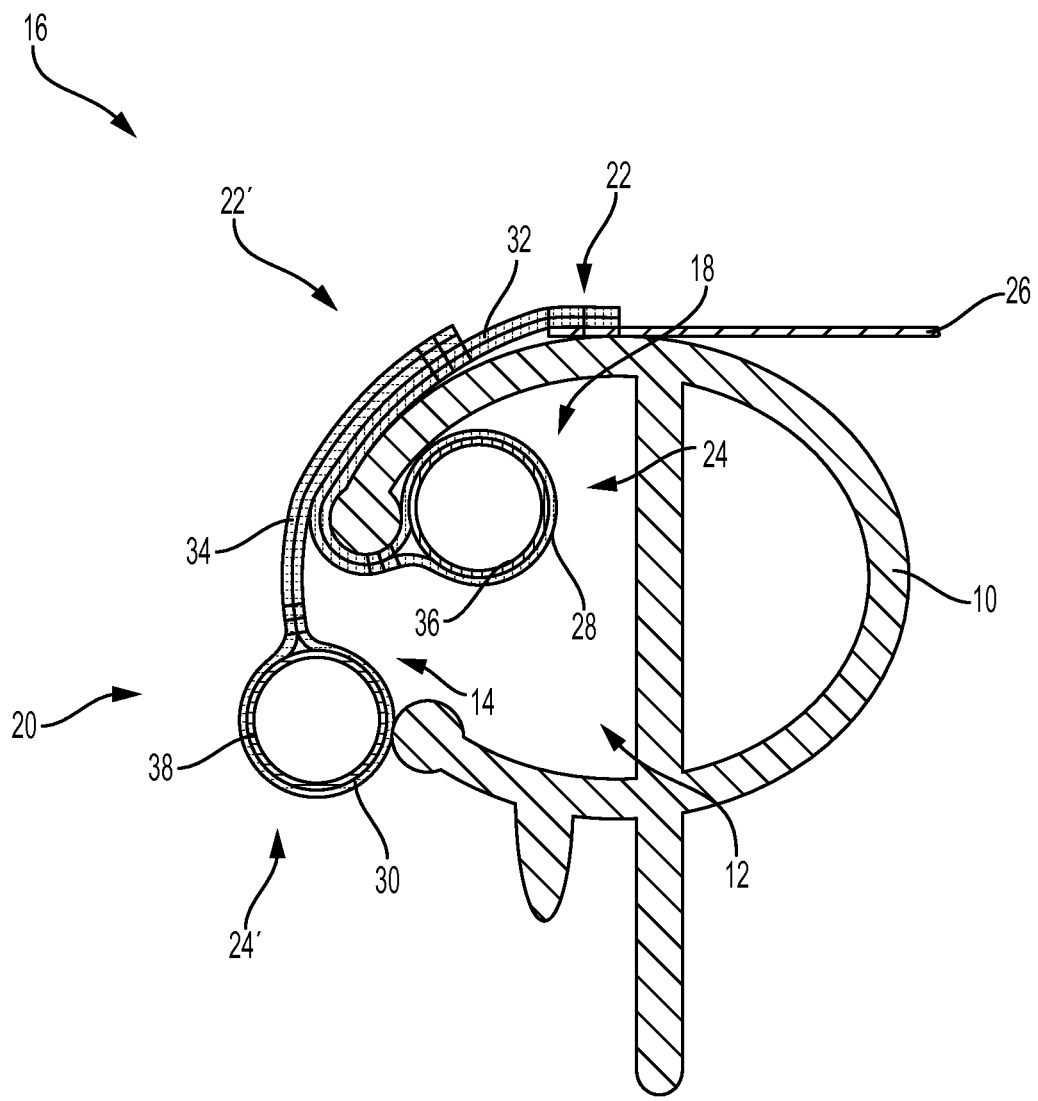
FIG. 2 is a cross sectional elevation view of the attachment of FIG. 1 partially engaged with the rail.
Figure 3:
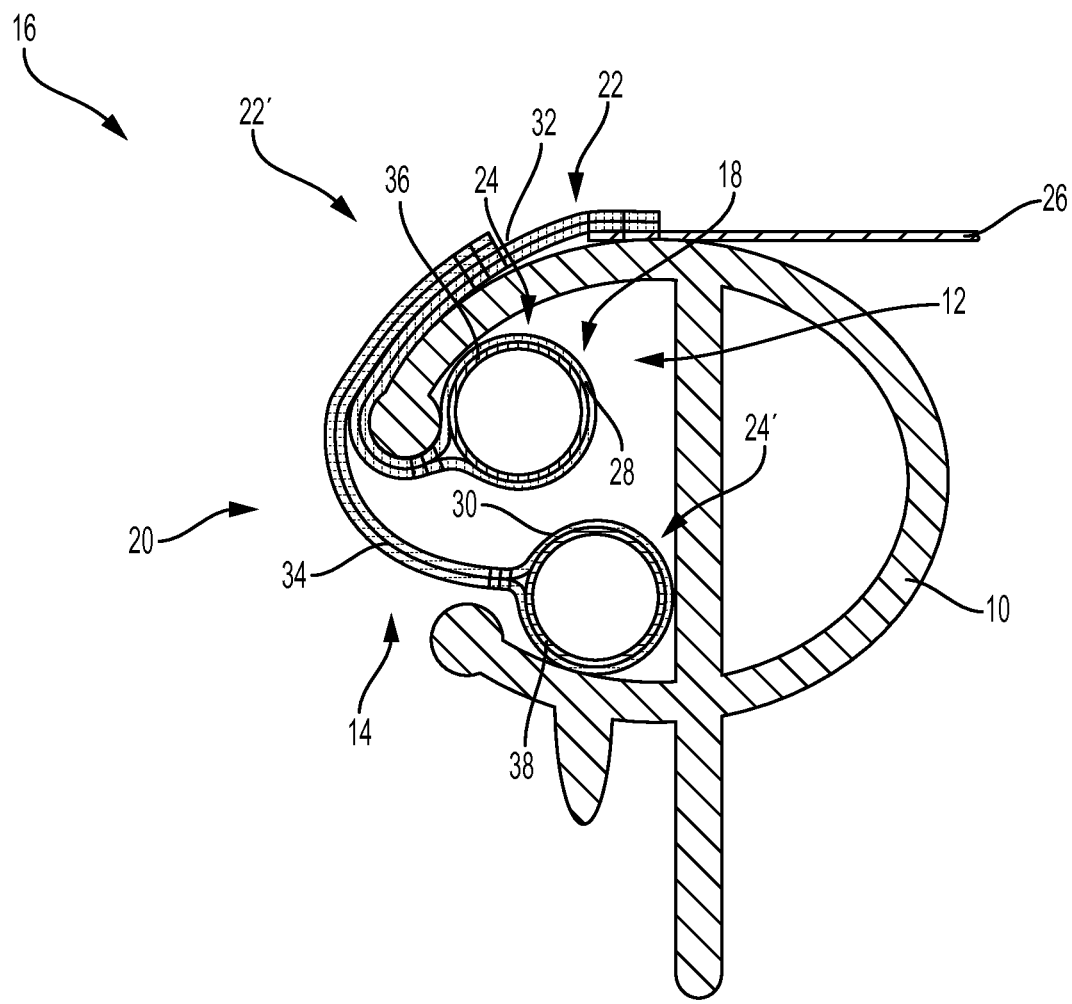
FIG. 3 is a cross sectional elevation view of the attachment of FIG. 1 engaged with the rail.
Figure 4:
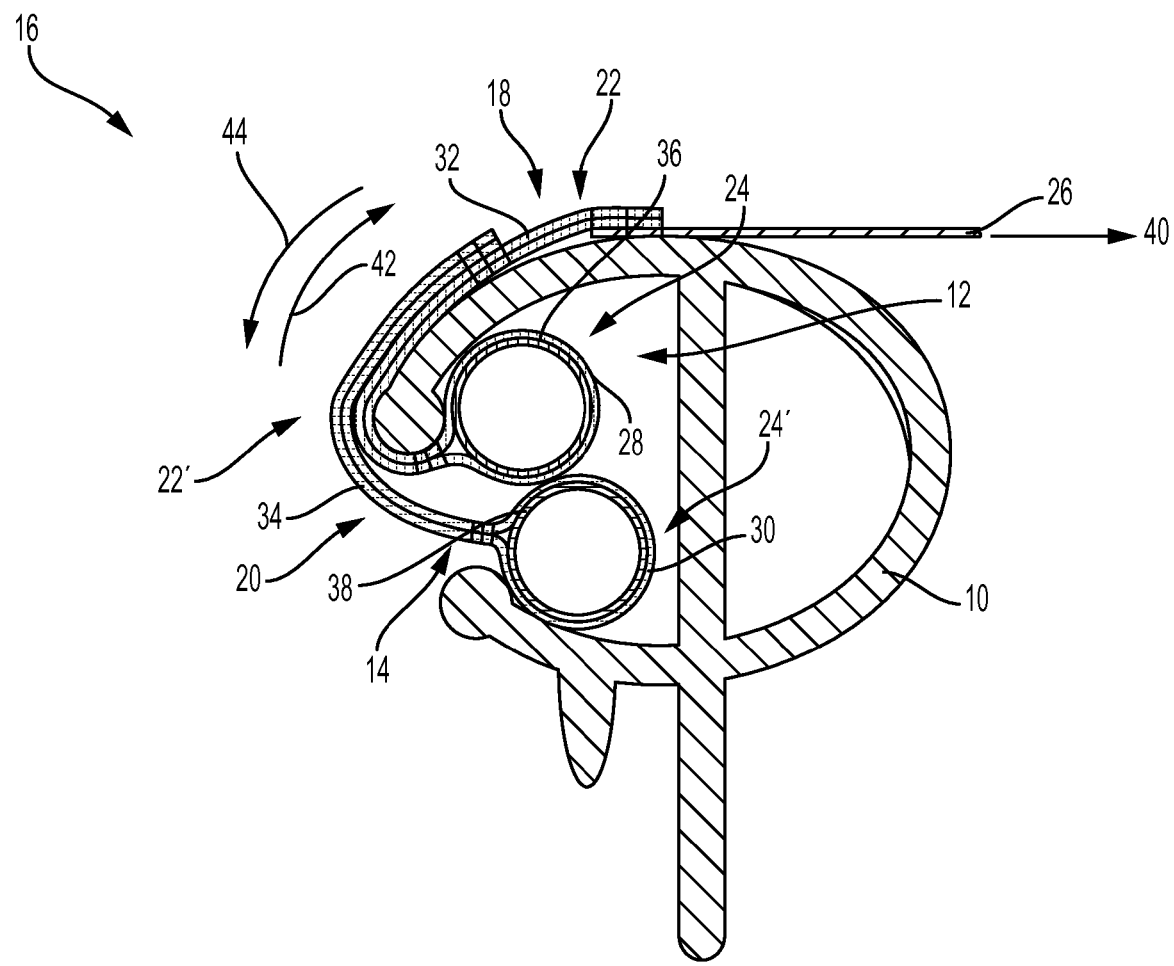
FIG. 4 is a cross sectional elevation view of the attachment of FIG. 1 engaged in the rail and a tensile force acting on the attachment.

To insert the attachment 16, the first welt 28 could be placed through the facial opening 14 and into the track 12 such that the facial opening is clear for the second welt 30 as seen in FIG. 2. Then, the second welt 30 could be placed through the facial opening 14 and into the track 12 as seen in FIG. 3. When a force 40 is applied to the attachment 16, for example, by tenting or otherwise tensioning a cover, a force 42 will be applied to the first and second keders 18, 20 in a direction dependent on the shape of the rail 10. The forces 40, 42 will cause the welts 28, 30 to contact one another and the edge of the facial opening 14 and to distort, compress or cam to form an object or mass that is larger than and unable to be easily pulled from the facial opening of the track 12, whereby the first and second welts act as one, as seen in FIG. 4. Similarly, a single welt and/or a single core could be used such that when the welt or core is inserted into the track, the welt or core is retained in the track when tensile force is applied as will be discussed further below.

To release the attachment 16 from the rail 10, force can be applied to the attachment 16 in an orientation 44 generally opposite that of the force applied to the keders 18, 20. When such force is applied to overcome the tension, each of the two welts 28, 30 may be removed from the facial opening 14 one at a time. Alternatively, the tension applied to the attachment 16 could be removed, such as be removing the tenting of a cover, thereby removing the forces 40, 42, which allows the welts 28, 30 to be removed from the facial opening 14 one at a time.

The welts 28, 30 could also be formed by, for example, using a material, such as a plastic, that, when wrapped in a loop or circle, can be thermally bonded to itself and have sufficient resilience so as to maintain its shape enough to prevent the attachment from being withdrawn from the facial opening 14 of the track 12 when tension is applied thereto.

In another embodiment seen in FIGS. 5-8, the attachment 16 has two keders 45, 46. The first keder 45 has a gasket type welt 48 and the second keder 46 has a smaller solid piping type welt 50. The first and second keders 45, 46 are attached to an accessory 26 by each keder's respective attachment portion 22, 22'.

Figure 5:
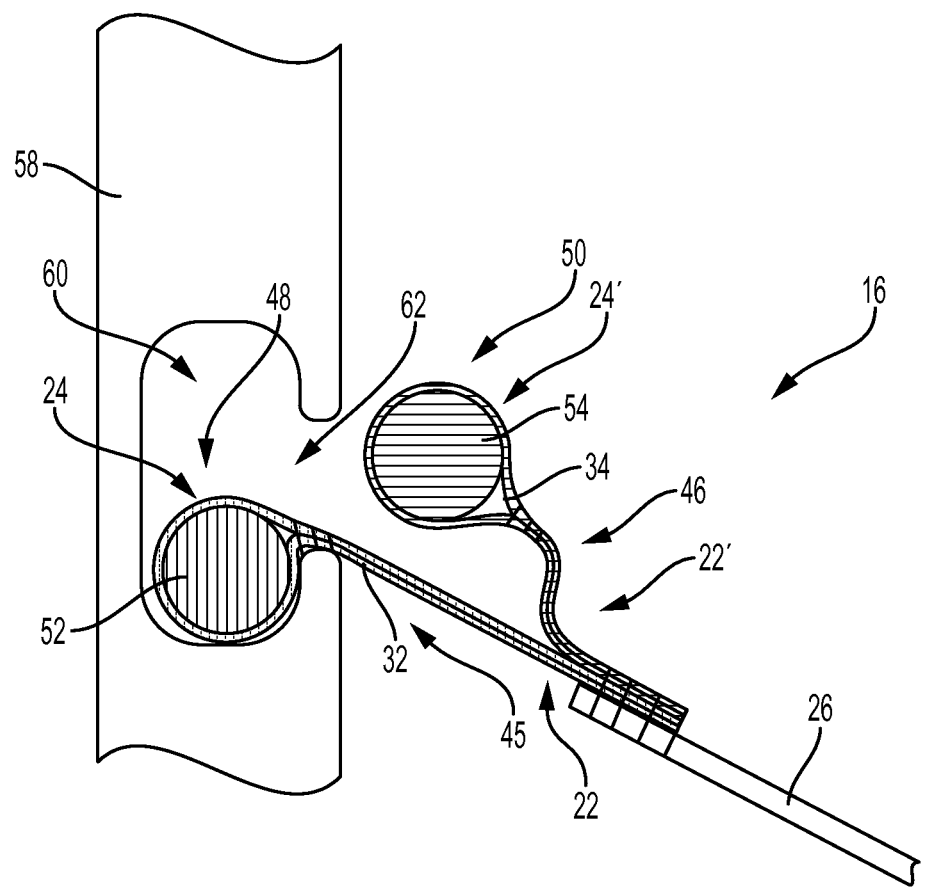
FIG. 5 is a cross sectional elevation view of another embodiment of an attachment partially engaged with the rail.

In the embodiment shown in FIGS. 5-8, the rail 58 has a racetrack shaped track 60. To attach the accessory 26 to the rail 58, the gasket type welt 48 is inserted through the facial opening 62 and into the track 60. As seen in FIG. 5, the gasket type welt 48 may be shaped and sized in diameter slightly larger than the facial opening 62 in the track 60 such that the gasket type welt is compressed as it goes through the facial opening. Therefore, the gasket type welt 48 is a flexible, compressible gasket that allows it to be inserted into the track 60. As seen in FIG. 5, the gasket type welt 48 is also sized in cooperation with the track 60, such that the gasket type welt creates an opening to part of the track that is smaller than the second, piping type welt 50. Once in the track 60, the gasket type welt 48 can be seated in the bottom of the track and decompress generally to its original form as seen in FIG. 5.

Figure 6:
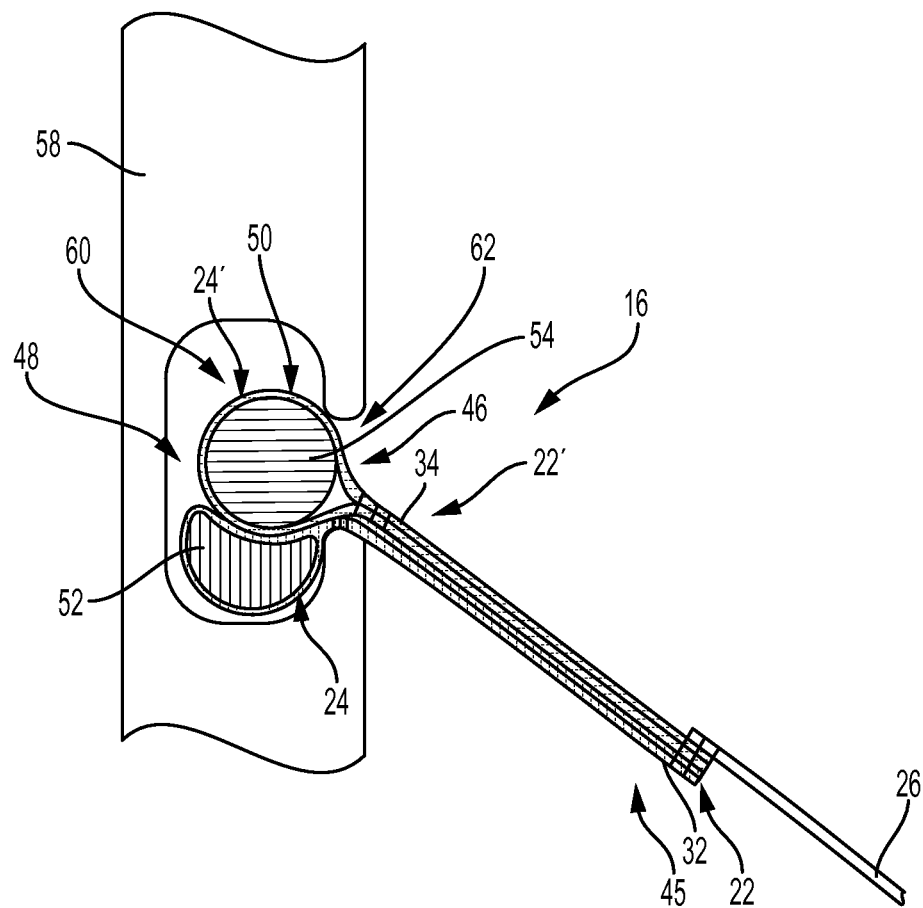
FIG. 6 is a cross sectional elevation view of the attachment of FIG. 5 with a second keder being inserted into the track.
Figure 7:
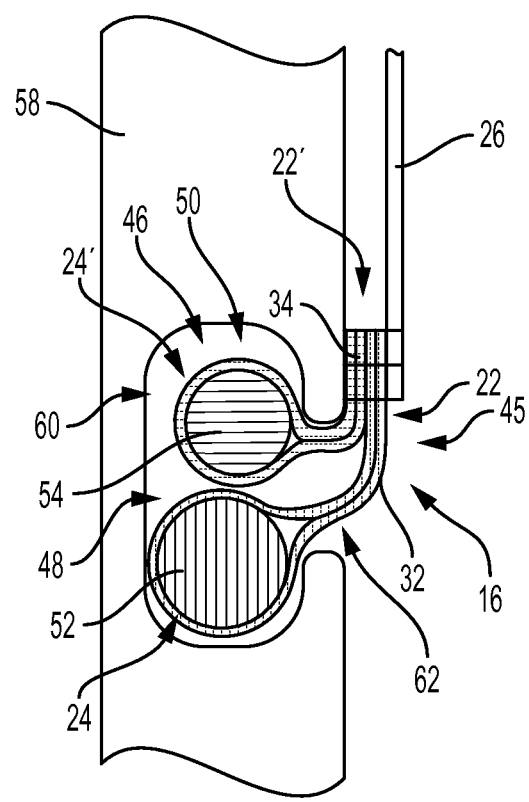
FIG. 7 is a cross sectional elevation view of the attachment of FIG. 5 engaged with the rail.

After the gasket type welt 48 is in the track 60, the second, piping type welt 50 may be inserted through the facial opening 62 wherein the force from the piping type welt causes the gasket type welt to compress to allow the piping type welt to enter the track as seen in FIG. 6. After the piping type welt is seated at the top of the track, the gasket type welt can decompress generally to its original form as seen in FIG. 7. The second, piping type welt 50 need not be as flexible as the gasket type welt 48 and therefore can be made from a more rigid piping. Due to the shape and size of the track 60, facial opening 62 and welts 48, 50, once both welts are inserted into the track and tension is added to the keders 45, 46, such as, for example by pulling the accessory 26 away from the rail 58, the welts cooperate to prevent from being withdrawn from the track.

Figure 8:
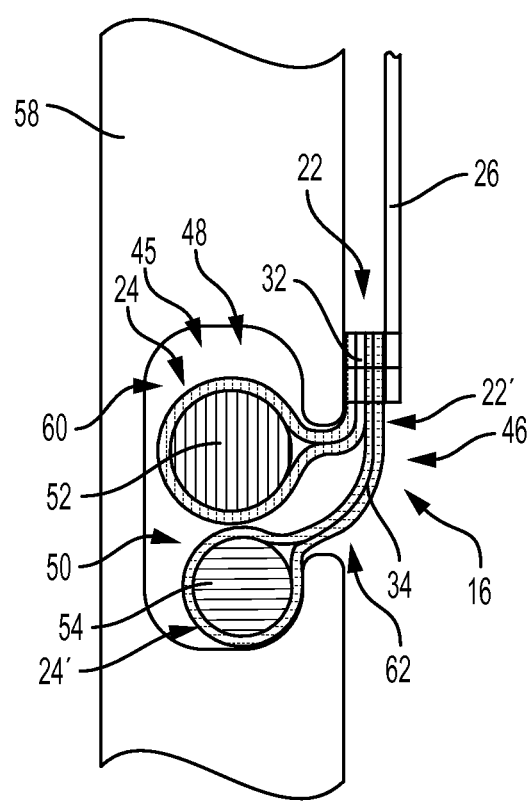
FIG. 8 is a cross sectional elevation view of another embodiment of an attachment engaged in a rail.

Alternatively, the gasket type welt 48 could be seated in the top of the track 60 and the piping type welt 50 seated in the bottom of the track as seen in FIG. 8. If the gasket type welt 48 is to be seated in the top portion of the track 60, it may be convenient to insert the piping type welt 50 in the track first.

Figure 9:
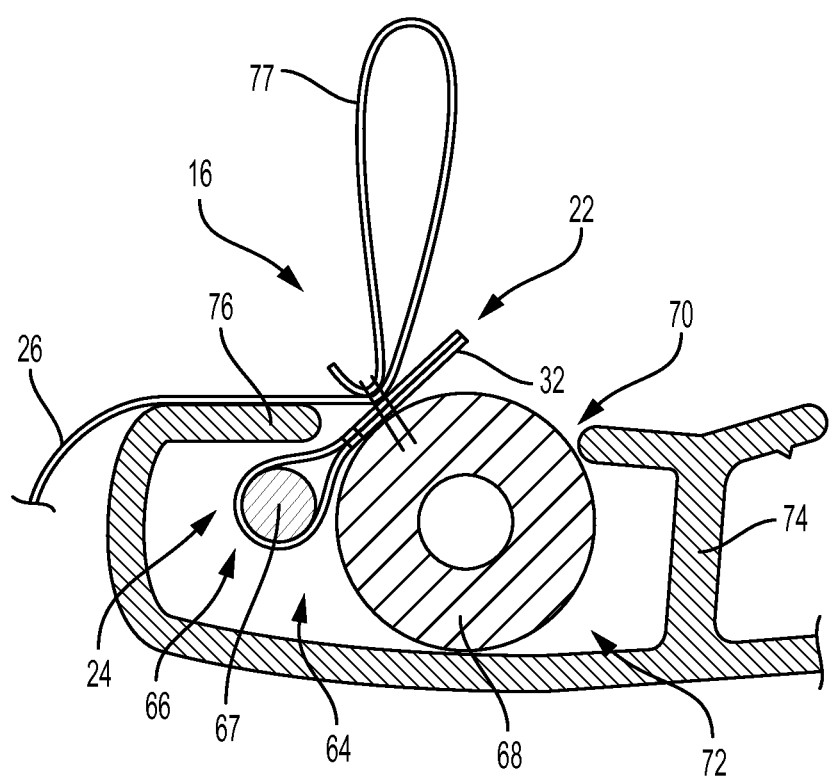
FIG. 9 is a cross sectional elevation view of another embodiment of an attachment engaged with a rail.

In another embodiment seen in FIG. 9, the attachment 16 includes a keder 64 with a welt 66 and two cores 67, 68. The welt 66 is formed by wrapping a keder material 32 around a first, harder core 67, such as piping, and then attaching the keder material back to itself to retain the first core. A second, softer core 68 is then attached to the keder 64, such as by stitching. The accessory 26 is also attached to the keder 64. In the example shown in FIG. 9, a series of stitches creates the welt 66 and attaches the second core 68 and accessory 26 to the welt and forms a handle 77 similar to handle 96 illustrated in FIG. 10.

To insert the keder 64 seen in FIG. 9, the second core 68 is inserted through the facial opening 70 of a track 72 in the rail 74 and into the track. Because the second core 68 is larger, the second core obstructs a portion of the facial opening 70. In order to seat the welt 66 in the track 72, the welt must be squeezed past the second core 68, thereby compressing the second core. As the welt 66 slides between the second core 68 and a lip 76 of the facial opening 70, there may be a slight snap that can be felt and/or heard. The snap may be a desired characteristic of the attachment 16 so that the user can readily distinguish if the attachment is seated properly. Further, as seen in FIG. 9, it is not necessary that the entire core be inside the track.

Figure 10:
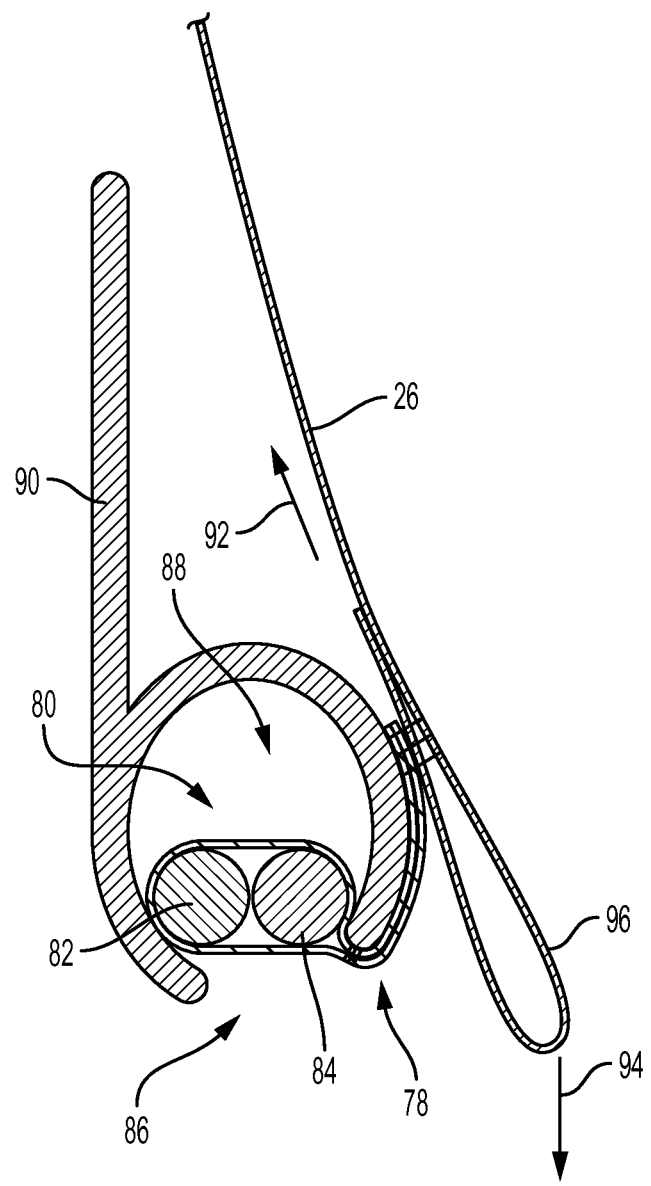
FIG. 10 is a cross sectional elevation view of another embodiment of an attachment engaged with a rail.

The attachment 16 could also include a keder with more than one core in the welt. As seen in FIG. 10, the attachment 16 includes a keder 78. The keder 78 has an engagement portion 24 with a welt 80. The welt 80 is formed from a keder fabric 32 that is wound around two cores 82, 84 to form a pocket that retains the two cores. The welt 80 can be inserted through the facial opening 86 to the track 88 in the rail 90 in a first orientation, e.g. the cores 82, 84 are inserted one after the other. When a force 92 is applied to the keder 78, such as, for example, by the accessory 26, the keder will rotate or the cores 82, 84 will rotate such that the cores cooperate to prevent the welt from being withdrawn from the track 88. To remove the keder 78 from the rail 90, a force 94 sufficient to and in a direction that will overcome the force 92 from the accessory can be applied to the keder via the handle 96. The cores 82, 84 in the welt 80 can then be oriented such that the welt can be withdrawn from the track 88 through the facial opening 86. This may allow speedier removal as the force 92 applied to the keder 78 does not need to be removed first.

Figure 11:
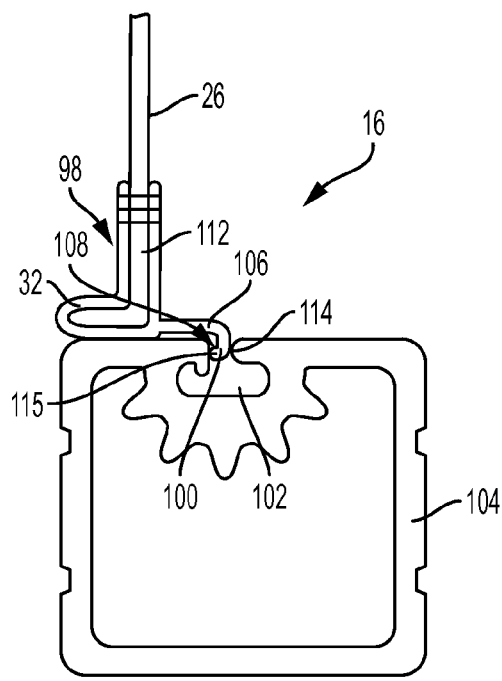
FIG. 11 is a cross sectional elevation view of another embodiment of an attachment being inserted into a track.

The engagement portion may have more or less than two cores. In the embodiment shown in FIGS. 11-13, the keder 98 of the attachment 16 has an engagement portion 24 with a single welt 100. The welt 100 shown in FIG. 11 is generally hook shaped and the track 102 of the rail 104 has a corresponding, general hook shape. The keder material, tape or binding 32 of the attachment 16 is essentially folded back over itself so as to make a pocket 106. A portion of the accessory 26 is inserted into the pocket 106 and the cover and keder material 32 are secured together such as by stitching. The accessory could also be attached to the keder material 32 without the formation of a pocket or by other known means of attaching two materials.

Figure 12:
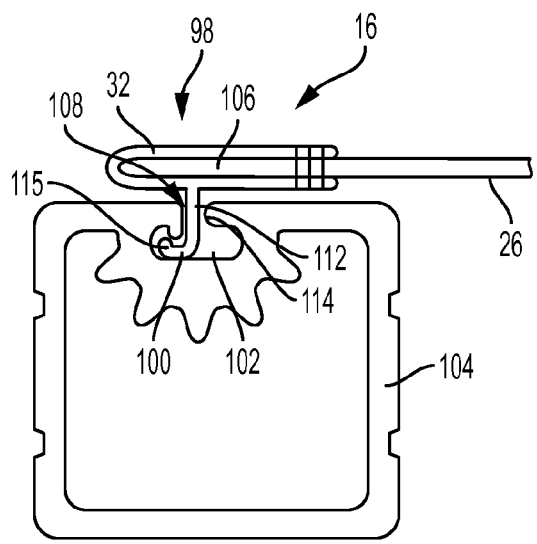
FIG. 12 is a cross sectional elevation view of the attachment of FIG. 11 engaged with a rail.

The hook-shaped welt 100 is inserted into the track 102 by placing the tip of the hook-shaped welt into the facial opening 108, as seen in FIG. 11, and then rotating the welt further into the track until the hook-shaped welt is fully inserted, as seen in FIG. 12.

Figure 13:
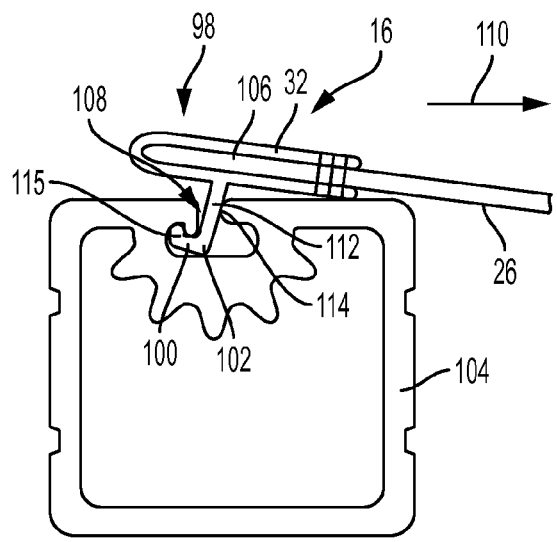
FIG. 13 is a cross sectional elevation view of the attachment of FIG. 11 engaged with a rail and a tensile force acting on the attachment.

When a force or tension 110 is placed on the attachment 16, such as through the accessory 26, the neck portion or shank 112 of the welt 100 contacts the corresponding lip 114 of the track 102 causing the welt to rotate clockwise and the tip 115 of the welt to further engage in or jam the inner portion of the track as seen in FIG. 13. To remove the welt 100 from the track 102 tension from the cover material 26 and thereby the keder 98 can be removed and the welt rotated the opposite to the way it was inserted, e.g. counterclockwise, out of the track. As seen in FIGS. 11-13, the entire keder can be made from one material such as a urethane or through injection molding or extruded plastic.

Figure 14:
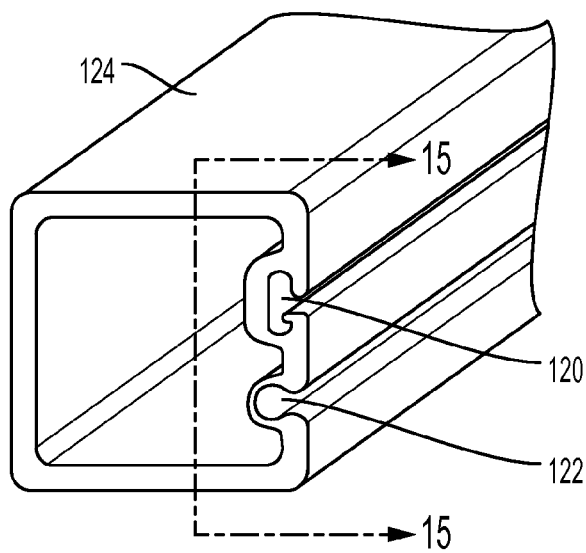
FIG. 14 is an end perspective view of a rail with two tracks.
Figure 15:
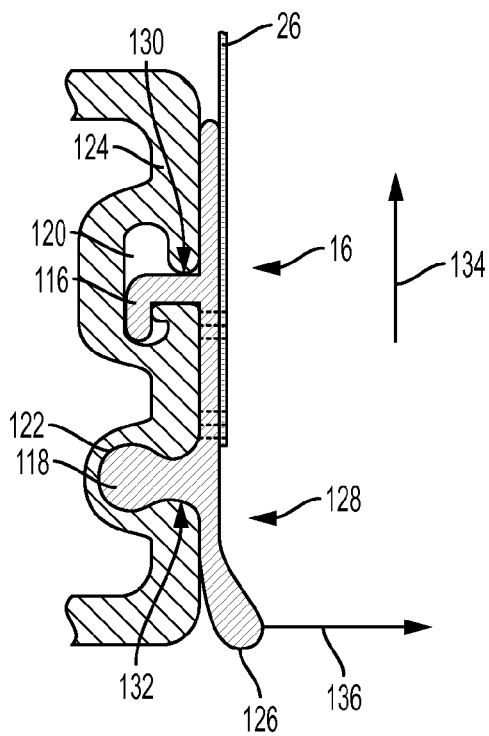
FIG. 15 is a cross sectional elevation view of another embodiment of an attachment engaged with the rail of FIG. 14.
Figure 16:
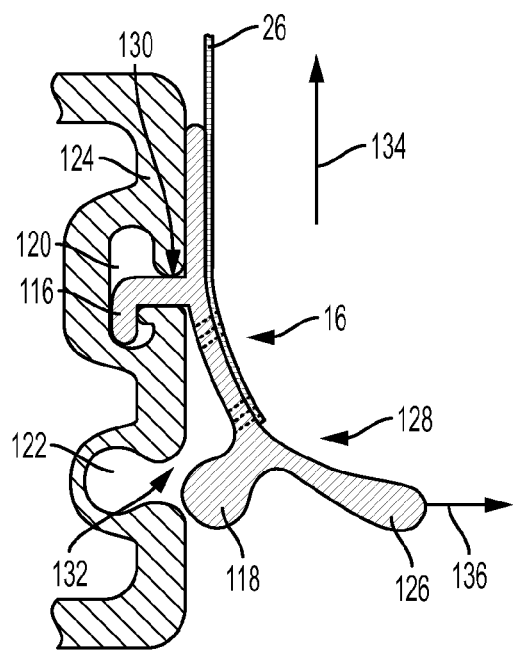
FIG. 16 is a cross sectional elevation view of the attachment of FIG. 15 partially removed from the rail.

In the embodiment shown in FIGS. 14-16, the attachment 16 has two welts that correspond to two tracks 120, 122 in a rail 124. The first welt 116 is generally hook-shaped and the first track 120 of the rail 124 has a corresponding, general hook shape. The second welt 118 has a general bulbous shape and the second track 122 has a corresponding, general bulbous shape. The attachment 16 of FIG. 15 also has a tab or handle 126 to assist in releasing the keder 128. A portion of an accessory 26 is shown sewn to the keder 128 between the first and second welts 116, 118.

To attach a portion of the accessory 26, such as a canvas cover, to the rail 124, the first welt 116 is inserted through the facial opening 130 of the first track 120 as described previously. The second welt 118 is inserted through the facial opening 132 of the second track 122. Because the largest diameter of the second welt 118 is larger than the facial opening 132 to the second track 122, the second welt is made of a compressible material that compresses to fit through the facial opening and then decompresses and expands, engages and/or is retained in the second track. Therefore, the second welt 118 can be made from a material that is able to compress and decompress such as a plastic compressible material.

After the first and second welts 116, 118 are seated in the corresponding first and second tracks 120, 122, tension can be added to the keder 128, such as through the accessory 26. For example, if the accessory 26 was a canvas cover for a boat, after the welts 116, 118 are seated in the tracks 120, 122 at select locations around the boat and at any interval, the cover can be tented to add tension to the cover and keder(s) 128. The tension will cause a force 134 to be applied to the keder 128 in an orientation generally parallel to the face of the rail 124 in which the facial openings 130, 132 ae located. The force 134 helps the welts 116, 118 remain held in the corresponding tracks 120, 122, such as by camming or jamming as described above.

To help retention of the first and second welts 116, 118, the keder 128 may be made from an elastic material and the welts spaced apart a distance slightly less than the distance between the first and second facial openings such that the keder must be stretched. For example, once one of the welts 116, 118 is inserted into the corresponding track 120, 122, the keder 128 may be stretched slightly to allow the other welt to be inserted into its corresponding track. After both of the welts 116, 118 are inserted into the corresponding tracks 120, 122, the keder 128 may try to retract back thus squeezing or putting tension on the two welts to help the welts remain within the tracks.

To remove the keder 128 from the rail 124, the tension on the keder may be removed, such as, in the example provided above, by removing the tent in the cover. Then the handle 126 can be pulled in an orientation 136 away from the facial openings 130, 132 to release the second welt 118 from the second track 122 and through the facial opening. Because the facial opening 132 to the second track 122 is smaller than the largest diameter of the second welt 118, the second welt will need to compress to fit through the facial opening. After the second welt 118 is removed, the first welt 116 can be removed from the first track 120 by rotating the welt out of the facial opening 130 and the accessory 26 is thereby released from the rail 124.

Figure 17:
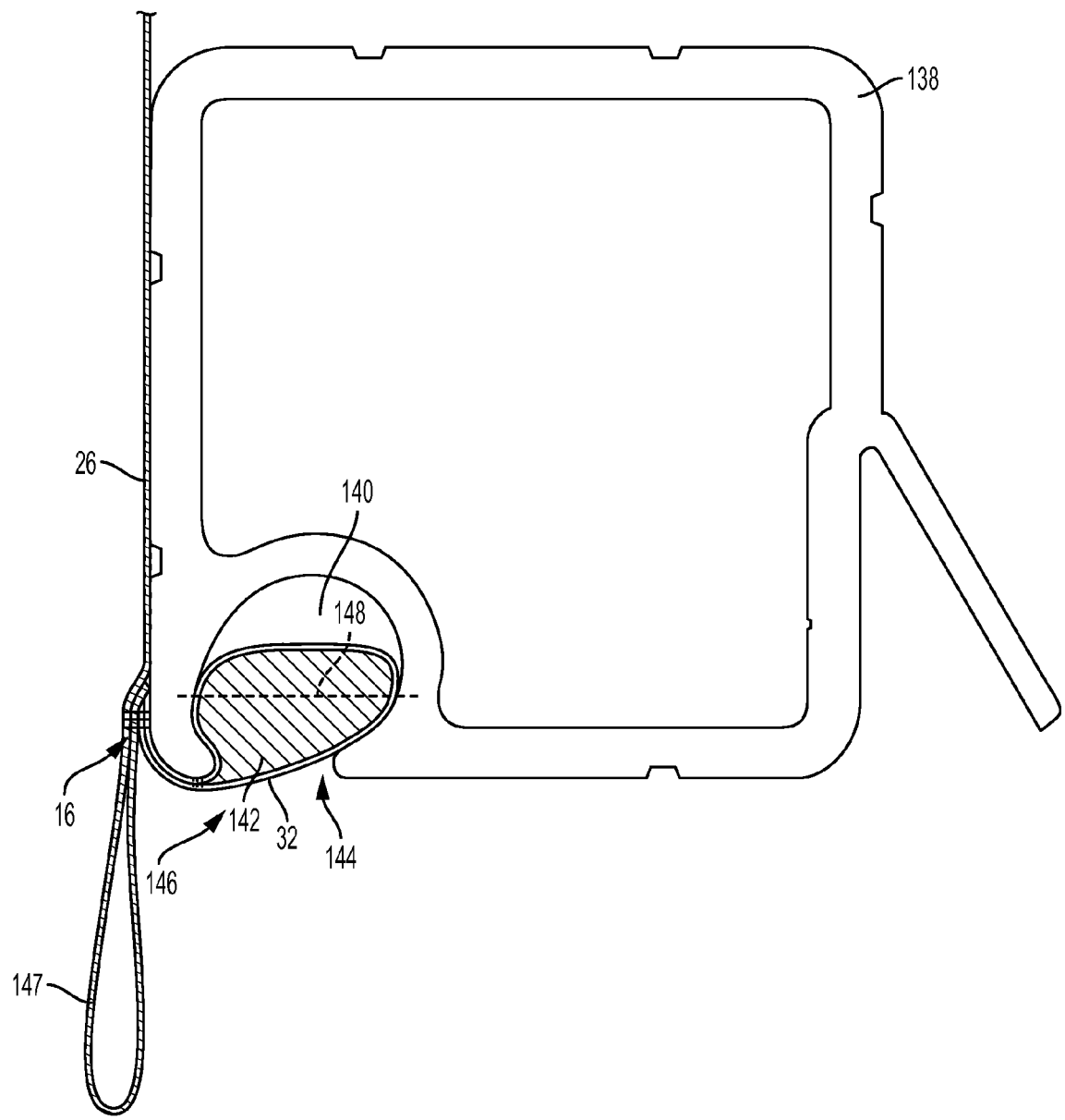
FIG. 17 is a cross sectional elevation view of another embodiment of an attachment engaged with a rail.

In another embodiment seen in FIG. 17, the rail 138 has a track 140 with a rounded shape. The attachment 16 has an oblong welt 142. The oblong welt 142 is shaped and sized. smaller in one direction such that the oblong welt can be inserted the facial opening 144 of the track 140 and larger in a second direction. The oblong welt 142 is wrapped with a keder material 32 which is used to attach the keder 146 to an accessory 26 and to form a handle 147 similar to handle 96 shown in FIG. 10.

The oblong welt 142 is inserted through the facial opening 144 of the track 140 such that the major axis 148 of the oblong welt is perpendicular to the facial opening. In FIG. 17, the oblong welt 142 is sized in the first direction just larger than the size of the facial opening such that some force must be used to insert the oblong welt and the oblong welt must compress to fit through the facial opening. Sizing the oblong welt 142 in the first direction just larger than the size of the facial opening has at least two positive effects. First, sizing the oblong welt in the first direction slightly larger than the facial opening prevents the oblong welt from being undesirably pulled out of the track before a force is applied to the oblong welt. Second, sizing the oblong welt in the first direction slightly larger than the facial opening provides a snap sound and/or feel to inform the user that the oblong welt is correctly seated in the track. When the oblong welt 142 is inserted into the track 140, the oval shape of the track cooperates with the oblong shape of the welt to promote rotation of the oblong welt to an orientation such that the major axis 148 of the oblong welt is generally parallel to the facial opening. When a force is applied via the accessory 26 and keder material 32 to the oblong welt 142, the oblong welt may further rotate and is prevented from being withdrawn through the facial opening.

Figure 18:
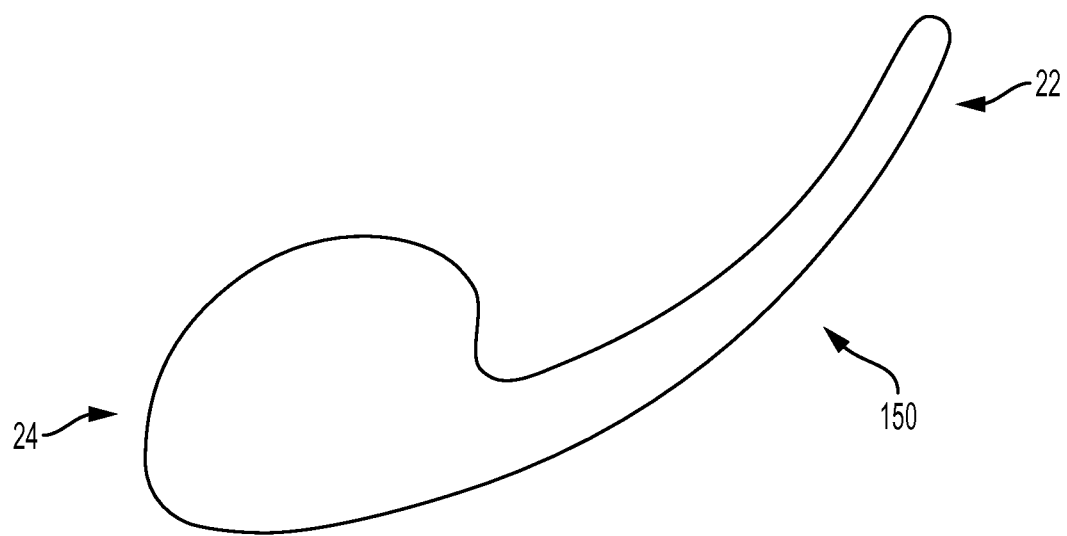
FIG. 18 is an end view of another embodiment of an attachment.

Welts, such as the oblong welt 142, may or may not be wrapped with a keder material 32, such as a fabric. For example, the keder 150 seen in FIG. 18 is integrally formed and has an engagement portion 24 that, like the oblong keder 146 seen in FIG. 17, is sized smaller than the facial opening of a facial opening in one direction and larger in a second direction. The keder 150 also has an integrally formed attachment portion 22 and is formed of a material that can be attached to a cover material 26, such as by being sewn.

The attachment may be used with current or future commercially available rails and track shapes and sizes, together with facial openings. For example, the rails of FIGS. 1-9 are currently commercially available and commonly found on marine vehicles such as boats. The rail of FIG. 10 is a current, commercially available track commonly found on an awning. The attachment may also be designed to fit a custom track and rail such as a track, rail and/or facial opening specifically designed to promote better engagement with a particular welt shape and size.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A keder for attaching an accessory to a rail having a track with a facial opening, the keder comprising:
   a welt having a shape with a major axis and a minor axis, the minor axis being generally perpendicular to the major axis; and
   a keder material secured to the welt at a first end and to the accessory at a second end;
   wherein the welt may be inserted through the facial opening and within the track when the major axis is generally perpendicular to the facial opening;
   wherein when the welt is within the track and a force is applied to the welt, the welt is rotated in the track such that the major axis is generally perpendicular to the facial opening and the shape of the welt prevents the welt from being withdrawn from the track through the facial opening.

2. The keder of claim 1, wherein the welt snaps into the track and wherein the snap indicates that the welt is properly engaged in the track.

3. The attachment of claim 1, wherein the welt produces an audible sound when inserted into the track and wherein the audible sound indicates that the welt is properly engaged in the track.

4. A method of attaching a cover to a boat having a rail with a track with a facial opening, the method comprising:
   inserting an oblong welt attached to the cover through the facial opening such that a major axis of the oblong welt is generally perpendicular to the facial opening;
   applying a tensile force to the oblong welt such that the oblong welt rotates within the track and the major axis of the oblong welt is generally parallel to the facial opening to prevent the oblong welt from being withdrawn from the track.

5. The keder of claim 1, wherein the welt is rotated when a tensile force is applied to the welt by the accessory.

6. The keder of claim 5, wherein when the tensile force is applied to the welt by the accessory and the welt is compressed in the track.

7. The keder of claim 1, wherein the welt is compressible and wherein the welt may be compressed to be inserted through the facial opening and into the track and after the welt is through the facial opening, the welt decompresses generally to its original form.

8. The keder of claim 5, further comprising a handle attached to the keder such that when the handle is pulled in a direction that overcomes the tensile force applied to the welt, the welt may be moved such that the major axis is generally perpendicular to the facial opening and removed from the track through the facial opening.

9. The keder of claim 5, wherein the accessory is a cover for a boat and the tensile force applied to the welt is the result of the cover being installed on the boat having a rail.

10. The method of claim 4 further comprising applying a force to a handle attached to the cover such that the tensile force applied to the oblong welt is overcome and the oblong welt may rotate within the track such that the major axis of the oblong welt is generally perpendicular to the facial opening to allow the oblong welt to be withdrawn from the track.

11. A cover having an attachment, by which the cover is capable of being connected to a rail on a boat, the rail having a track with a facial opening, the attachment comprising:
    an oblong core having a major axis; and
    a material wrapped around the oblong core and attached to the cover;
    wherein the cover is folded over and secured to form a handle;
    wherein the attachment is selectively movable between a first position and a second position within the track;
    wherein when the attachment is in the first position, the major axis of the oblong core is generally transverse to the facial opening such that the attachment is capable of passing through the facial opening;
    wherein when the attachment is in the second position, the major axis of the oblong core is generally parallel to the facial opening such that the attachment is prevented from passing through the opening;
    wherein when the attachment is in the track and a force is applied to the attachment by the cover, the attachment moves from the first position to the second position; and
    wherein when the force applied to the attachment by the cover is offset, the attachment is movable from the second position to the first position.

12. The attachment of claim 11 wherein when a second force is applied to the handle, the attachment is movable from the second position to the first position.

* * * * *